US008331679B2

(12) United States Patent
Boncyk et al.

(10) Patent No.: US 8,331,679 B2
(45) Date of Patent: *Dec. 11, 2012

(54) OBJECT INFORMATION DERIVED FROM OBJECT IMAGES

(75) Inventors: Wayne C. Boncyk, Evergreen, CO (US); Ronald H. Cohen, Pasadena, CA (US)

(73) Assignee: Nant Holdings IP, LLC, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/207,211

(22) Filed: Aug. 10, 2011

(65) Prior Publication Data

US 2011/0292204 A1  Dec. 1, 2011

Related U.S. Application Data

(60) Division of application No. 13/037,330, filed on Feb. 28, 2011, which is a division of application No. 12/568,130, filed on Sep. 28, 2009, which is a division of application No. 11/204,901, filed on Aug. 15, 2005, now Pat. No. 7,680,324, which is a continuation-in-part of application No. 09/992,942, filed on Nov. 5, 2001, now Pat. No. 7,016,532.

(60) Provisional application No. 60/317,521, filed on Sep. 5, 2001, provisional application No. 60/246,295, filed on Nov. 6, 2000, provisional application No. 60/630,524, filed on Nov. 22, 2004, provisional application No. 60/625,526, filed on Nov. 4, 2004.

(51) Int. Cl.
*G06K 9/00* (2006.01)

(52) U.S. Cl. .................................................. 382/181
(58) Field of Classification Search ............... 382/181, 382/224, 305, 100, 165; 348/239, 211.2–211.6, 348/207.1, 223.1, 231.6, 460, 552; 455/414.3, 455/411, 414.2, 412.1; 705/26.1, 27.1, 7.33
See application file for complete search history.

(56) References Cited

U.S. PATENT DOCUMENTS

| 5,579,471 | A | 11/1996 | Barber et al. |
| 5,615,324 | A | 3/1997 | Kuboyama |
| 5,625,765 | A | 4/1997 | Ellenby et al. |
| 5,682,332 | A | 10/1997 | Ellenby et al. |
| 5,724,579 | A | 3/1998 | Suzuki |
| 5,742,521 | A | 4/1998 | Ellenby et al. |
| 5,751,286 | A | 5/1998 | Barber et al. |
| 5,768,633 | A | 6/1998 | Allen et al. |
| 5,815,411 | A | 9/1998 | Ellenby et al. |
| 5,926,116 | A | 7/1999 | Kitano et al. |
| 5,933,823 | A | 8/1999 | Cullen et al. |
| 5,933,829 | A | 8/1999 | Durst et al. |
| 5,978,773 | A | 11/1999 | Hudetz et al. |
| 5,991,827 | A | 11/1999 | Ellenby et al. |
| 6,031,545 | A | 2/2000 | Ellenby et al. |

(Continued)

FOREIGN PATENT DOCUMENTS

EP   0920179   9/2000

(Continued)

*Primary Examiner* — Ishrat I Sherali

(74) *Attorney, Agent, or Firm* — Fish & Associates, PC

(57) ABSTRACT

Search terms are derived automatically from images captured by a camera equipped cell phone, PDA, or other image capturing device, submitted to a search engine to obtain information of interest, and at least a portion of the resulting information is transmitted back locally to, or nearby, the device that captured the image.

20 Claims, 8 Drawing Sheets

U.S. PATENT DOCUMENTS

| | | | |
|---|---|---|---|
| 6,037,936 A | 3/2000 | Ellenby et al. | |
| 6,055,536 A | 4/2000 | Shimakawa et al. | |
| 6,064,398 A | 5/2000 | Ellenby et al. | |
| 6,081,612 A | 6/2000 | Gutkowicz-Krusin et al. | |
| 6,098,118 A | 8/2000 | Ellenby et al. | |
| 6,108,656 A | 8/2000 | Durst et al. | |
| 6,144,848 A | 11/2000 | Walsh et al. | |
| 6,173,239 B1 | 1/2001 | Ellenby | |
| 6,181,817 B1 | 1/2001 | Zabih et al. | |
| 6,182,090 B1 | 1/2001 | Peairs | |
| 6,199,048 B1 | 3/2001 | Hudetz et al. | |
| 6,208,749 B1 | 3/2001 | Gutkowicz-Krusin et al. | |
| 6,256,409 B1 | 7/2001 | Wang | |
| 6,278,461 B1 | 8/2001 | Ellenby et al. | |
| 6,286,036 B1 | 9/2001 | Rhoads | |
| 6,307,556 B1 | 10/2001 | Ellenby et al. | |
| 6,307,957 B1 | 10/2001 | Gutkowicz-Krusin et al. | |
| 6,393,147 B2 | 5/2002 | Danneels et al. | |
| 6,396,475 B1 | 5/2002 | Ellenby et al. | |
| 6,396,537 B1 | 5/2002 | Squilla et al. | |
| 6,411,725 B1 | 6/2002 | Rhoads | |
| 6,414,696 B1 | 7/2002 | Ellenby et al. | |
| 6,430,554 B1 | 8/2002 | Rothschild | |
| 6,434,561 B1 | 8/2002 | Durst, Jr. et al. | |
| 6,453,361 B1 | 9/2002 | Morris | |
| 6,522,292 B1 | 2/2003 | Ellenby et al. | |
| 6,522,889 B1 | 2/2003 | Aarnio | |
| 6,532,298 B1 | 3/2003 | Cambier et al. | |
| 6,535,210 B1 | 3/2003 | Ellnby et al. | |
| 6,542,933 B1 | 4/2003 | Durst, Jr. et al. | |
| 6,567,122 B1 | 5/2003 | Anderson et al. | |
| 6,651,053 B1 | 11/2003 | Rothschild | |
| 6,674,923 B1 | 1/2004 | Shih et al. | |
| 6,674,993 B1 | 1/2004 | Tarbouriech | |
| 6,675,165 B1 | 1/2004 | Rothschild | |
| 6,690,370 B2 | 2/2004 | Ellenby et al. | |
| 6,691,914 B2 | 2/2004 | Isherwood et al. | |
| 6,714,969 B1 | 3/2004 | Klein et al. | |
| 6,724,914 B2 | 4/2004 | Brundage et al. | |
| 6,738,630 B2 | 5/2004 | Ashmore | |
| 6,766,363 B1 | 7/2004 | Rothschild | |
| 6,804,726 B1 | 10/2004 | Ellenby et al. | |
| 6,842,181 B2 | 1/2005 | Acharya | |
| 6,865,608 B2 | 3/2005 | Hunter | |
| 6,885,771 B2 | 4/2005 | Takahashi | |
| 6,993,573 B2 | 1/2006 | Hunter | |
| 7,016,532 B2 * | 3/2006 | Boncyk et al. | 382/165 |
| 7,127,094 B1 | 10/2006 | Elbaum et al. | |
| 7,301,536 B2 | 11/2007 | Ellenby et al. | |
| 7,362,922 B2 | 4/2008 | Nishiyama et al. | |
| 7,383,209 B2 | 6/2008 | Hudetz et al. | |
| 7,430,588 B2 | 9/2008 | Hunter | |
| 7,580,061 B2 * | 8/2009 | Toyoda | 348/223.1 |
| 7,641,342 B2 | 1/2010 | Eberl et al. | |
| 7,680,324 B2 * | 3/2010 | Boncyk et al. | 382/165 |
| 7,696,905 B2 | 4/2010 | Ellenby et al. | |
| 7,765,126 B2 | 7/2010 | Hudetz et al. | |
| 7,916,138 B2 | 3/2011 | John et al. | |
| 2001/0011276 A1 | 8/2001 | Durst, Jr. et al. | |
| 2001/0032252 A1 | 10/2001 | Durst, Jr. et al. | |
| 2001/0044824 A1 | 11/2001 | Hunter et al. | |
| 2001/0047426 A1 | 11/2001 | Hunter | |
| 2002/0019819 A1 | 2/2002 | Sekiguchi et al. | |
| 2002/0055957 A1 | 5/2002 | Ohsawa | |
| 2002/0089524 A1 | 7/2002 | Ikeda | |
| 2002/0090132 A1 | 7/2002 | Boncyk et al. | |
| 2002/0102966 A1 | 8/2002 | Lev et al. | |
| 2002/0103813 A1 | 8/2002 | Frigon | |
| 2002/0140988 A1 | 10/2002 | Cheatle et al. | |
| 2002/0156866 A1 | 10/2002 | Schneider | |
| 2002/0163521 A1 | 11/2002 | Ellenby et al. | |
| 2003/0095681 A1 | 5/2003 | Burg et al. | |
| 2004/0208372 A1 | 10/2004 | Boncyk et al. | |
| 2005/0015370 A1 | 1/2005 | Stavely et al. | |
| 2005/0024501 A1 | 2/2005 | Ellenby et al. | |
| 2005/0162523 A1 | 7/2005 | Darrell et al. | |
| 2005/0162532 A1 * | 7/2005 | Toyoda | 348/231.6 |
| 2005/0185060 A1 | 8/2005 | Never, Sr. | |
| 2007/0109619 A1 | 5/2007 | Eberl et al. | |
| 2008/0021953 A1 | 1/2008 | Gil | |
| 2010/0045933 A1 | 2/2010 | Eberl et al. | |

FOREIGN PATENT DOCUMENTS

| | | |
|---|---|---|
| EP | 1355258 | 2/2003 |
| EP | 2264669 | 12/2010 |
| GB | 2407230 | 9/2003 |
| JP | 10-91634 | 4/1998 |
| JP | 10-289243 | 10/1998 |
| JP | 2001101191 | 4/2001 |
| JP | 2001282825 | 10/2001 |
| WO | 97/44737 | 11/1997 |
| WO | 97/49060 | 12/1997 |
| WO | 98/37811 | 9/1998 |
| WO | 99/16024 | 4/1999 |
| WO | 99/42946 | 8/1999 |
| WO | 99/42947 | 8/1999 |
| WO | 99/44010 | 9/1999 |
| WO | 01/24050 | 4/2001 |
| WO | 01/49056 | 7/2001 |
| WO | 01/63487 | 8/2001 |
| WO | 01/71282 | 9/2001 |
| WO | 01/73603 | 10/2001 |
| WO | 02/01143 | 1/2002 |
| WO | 02/082799 | 10/2002 |

* cited by examiner

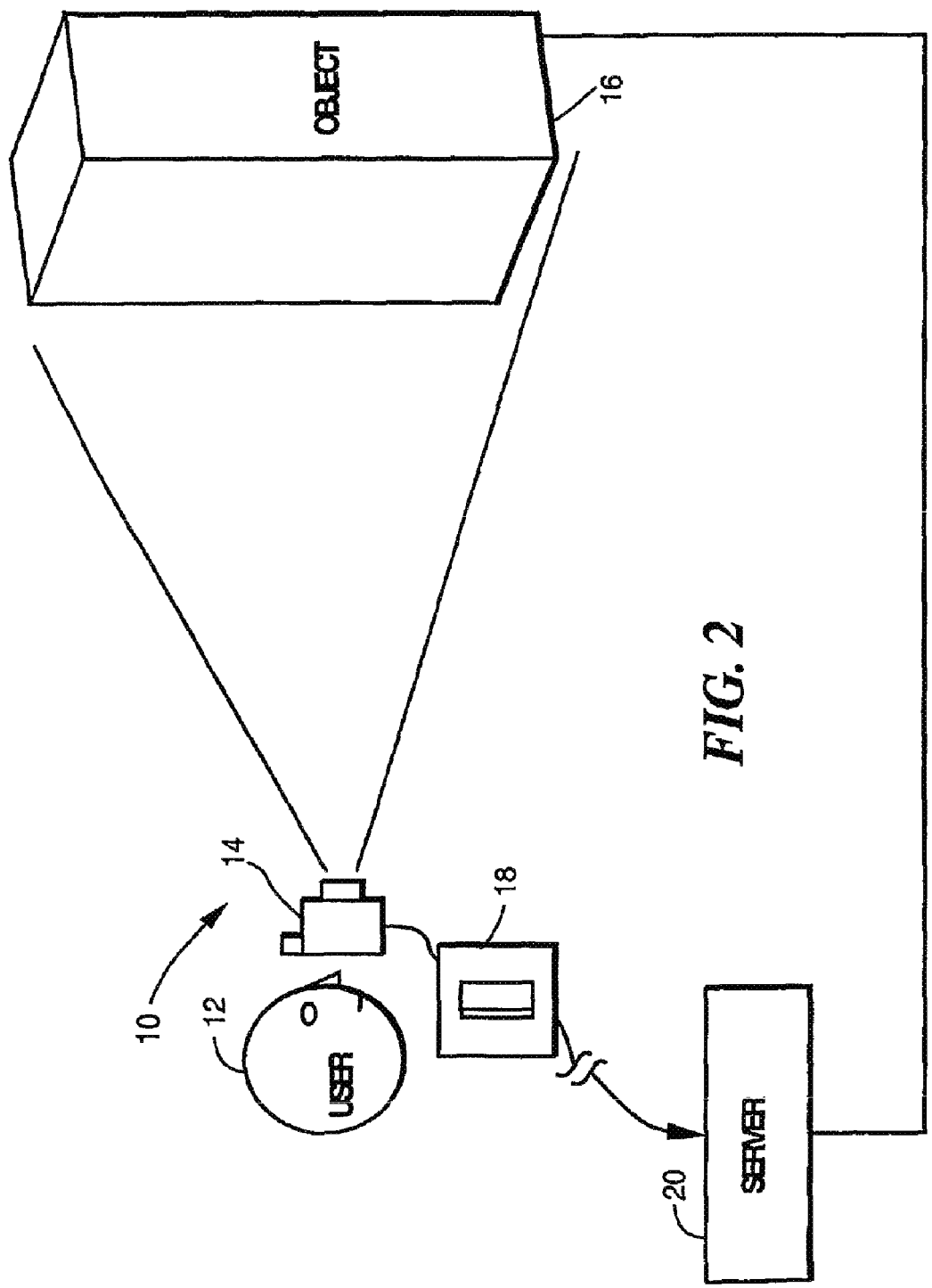

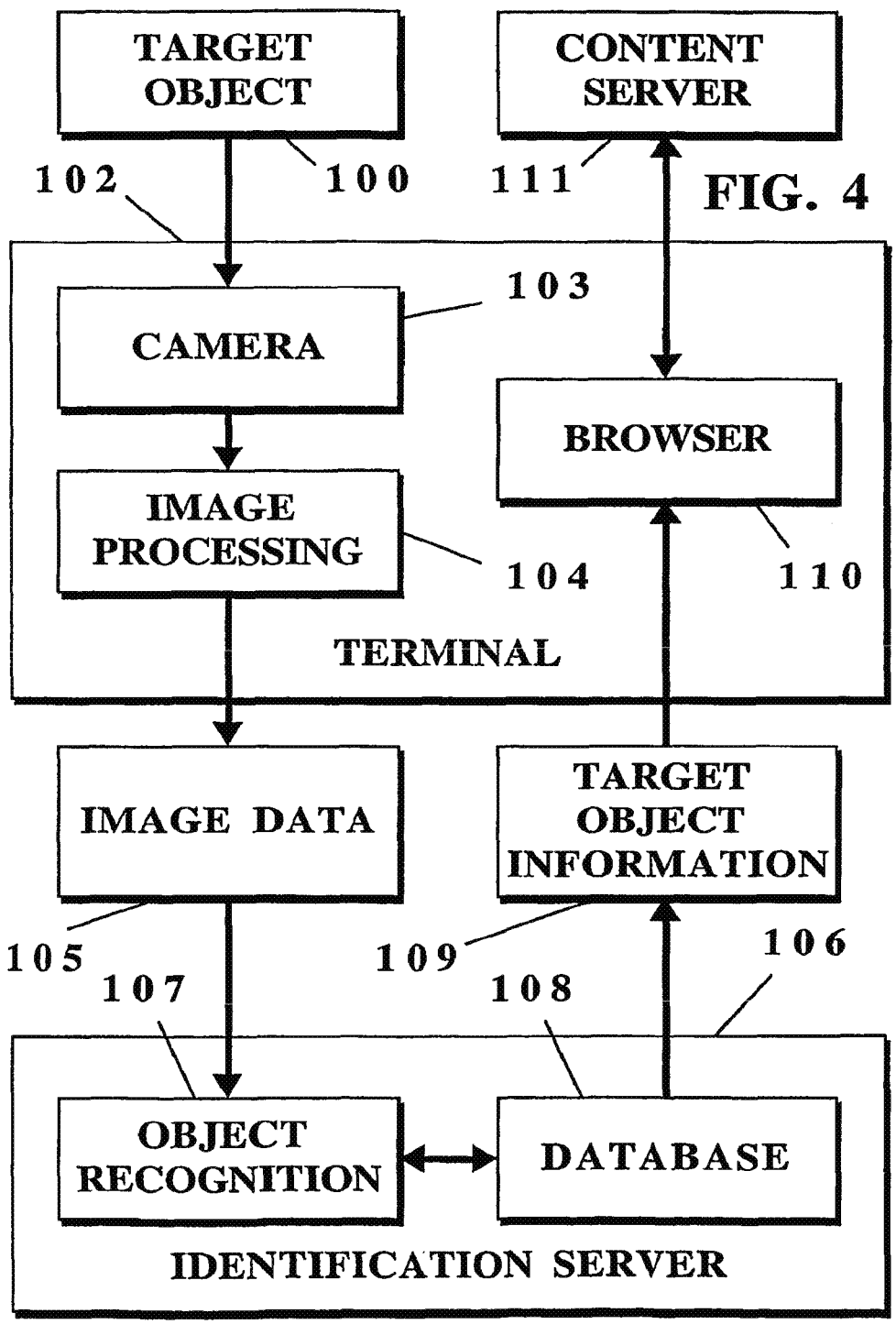

OBJECT INFORMATION DERIVED FROM OBJECT IMAGES

This application is a divisional of Ser. No. 13/037,330 filed Feb. 28, 2011 which is a divisional of Ser. No. 12/568,130 filed Sep. 28, 2009 which is a divisional of Ser. No. 11/204,901 filed Aug. 15, 2005 which is a continuation-in-part of Ser. No. 09/992,942 filed Nov. 5, 2001 and issued as U.S. Pat. No. 7,016,532 on Mar. 1, 2006, which claims priority to provisional application No. 60/317,521 filed Sept. 5, 2001 and provisional application number 60/246,295 filed Nov. 6, 2000. Ser. No. 11/204,901 filed Aug. 15, 2005 and issued as U.S. Pat. No. 7,899,252 on Mar. 1, 2011 also claims priority to provisional application No. 60/630,524 filed Nov. 22, 2004 and provisional application No. 60/625,526 filed Nov. 4, 2004. These and all other referenced patents and applications are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invert digital imaging.

BACKGROUND

Several years ago the present inventors pioneered the concept of using digitally captured images to identify objects within the images, and then using such identifications to retrieve information from various databases. Examples include:
  Using a local device (cell phone, digital camera, PDA or other device to capture an image of an object in an art museum, identifying the object from the image data, and then providing the user with information regarding the object (i.e., about or relating to the object);
  Using a local device (cell phone, digital camera, PDA or other device) to capture an image of an automobile as it drives along a road, identifying the make and model from the image data, and then providing a user with a link to a website relating to that particular make and model;
  Using a local device (cell phone, digital camera, PDA or other device) to capture an image of a bar code, logo, or other indicia in a magazine, using information contained in the indicia to identify a product, and providing a telephone number or other contact information relating to that product;
  Using a local device (cell phone, digital camera, PDA or other device) to photograph a billboard of a restaurant, identifying the restaurant from a barcode, special target, written language, or other information contained in the photograph, and using that information to access a database to provide the user with restaurant's location, menu, or telephone number; and
  Using a local device (cell phone, digital camera, PDA or other device) to capture an image of a sign at a sports stadium, using information extracted from the image to automatically purchase an entry ticket for the user, and providing the user with an entry code that can be used to bypass the long lines of ordinary ticket purchasers.

In such embodiments it was specifically contemplated that analysis of the images could be performed locally (i.e. on the cell phone, PDA or other device capturing the image), distally at a server, or more preferably using some combination of the two. It was also contemplated that any available database could be accessed to provide the returned information, including publicly accessible databases on the Internet. It was not appreciated, however, that one could integrate these concepts with the searching capabilities of standard Search Engines.

In the 1990s Yahoo!™ introduced the idea of indexing web pages accessible on Internet, and providing a Search Engine that to access the index. Since that time dozens of other searching systems have been developed, which use all manner of various search methods, algorithms, hardware and/or software. All such systems and methods that accept user inputs of Key Information, and then utilize such Key Information to provide the user with information of interest, are referred to herein as Search Engines. The user, of course, can be a natural person, as well as a device (computing or otherwise), algorithm, system, organization, or any other entity. In searching for information, a Search Engine can utilize any suitable search domain, including for example:
  A database (including for example a relational database, an object database, or an XML database).
  A network of resources including for example web pages accessible within the Internet; and
  A public or private collection of documents or information (e.g., documents, information, and/or messages of a company or other organization(s)) such as that maintained by LEXIS™.

In a typical search, Key Information is provided to the Search Engine in the form of key words comprising text, numbers, strings, or other machine-readable information types. The Search Engine then searches its indices of web pages for matches, and returns to the user a hyperlinked listing of Internet Uniform Resource Locators ("URLs"), as well as some brief display of context in which the key word(s) are used. The information of interest can sometimes be found in the hyperlinked listing, but is more frequently found by linking directly to the listed web pages.

Providing Key Information to Search Engines in the form of text strings has inherent difficulties. It involves strategy in the selection of the text to be entered, and even with respect to the format of the keywords (for example using wildcards). Another difficulty is that small computing and/or telephony devices (e.g. telephones, both mobile and non-mobile), have small and/or limited keyboards, thus making text entry difficult.

SUMMARY OF THE INVENTION

The present invention provides apparatus, systems and methods in which: (a) a digital photograph, video, MPEG, AVI, or other image is captured using a camera equipped cell phone, PDA, or other image capturing device; (b) key words or other search criteria are automatically extracted or derived from image; (c) the search criteria are submitted to a Search Engine to obtain information of interest; and (d) at least a portion of the resulting information is transmitted back locally to, or nearby, the device that captured the image.

Some images so utilized will include symbolic content that is sufficient in and of itself to be relatively non-ambiguous. Such symbolic content, for example, can be a telephone number or a web-site address. In such instances the symbolic content search criteria can advantageously be utilized as a literal in the search criteria. In other instances significant additional processing can be needed. For example, an image of an automobile will likely need to be processed to determine the make and model, and that information (e.g. Mercedes™ S500™) can then be transmitted to the Search Engine to be used as key words for a search. It is also contemplated that processing of some images will result in only best guesses. Thus, a side view of an automobile can not be analyzable into a particular make and model, and in that case the system can provide more generic terms such as SUV or automobile.

In general, the present invention provides technology and processes that can accommodate linking objects and images to information via a network such as the Internet, which require no modification to the linked object. Traditional methods for linking objects to digital information, including applying a barcode, radio or optical transceiver, or transmitter, or some other means of identification to the object, or modifying the image or object so as to encode detectable information in it, are not required because the image or object can be identified solely by its visual appearance. The users or devices can even interact with objects by "linking" to them. For example, a user can link to a vending machine by "pointing and clicking" on it. His device would be connected over the Internet to the company that owns the vending machine. The company would in turn establish a connection to the vending machine, and thus the user would have a communication channel established with the vending machine and could interact with it.

The present invention contemplates any suitable decomposition algorithms. Clearly, faster and more accurate algorithms are preferred over slower and less accurate algorithms. It is especially preferred that algorithms are chosen such that at least some processing can take place locally to the device that captures the image. Such processing can in many instances eliminate the need to wirelessly transmit detailed images, and can eliminate reliance on a distal server that might be oversubscribed. Thus, some or all of the image processing, including image/object detection and/or decoding of symbols detected in the image can be distributed arbitrarily between the mobile (client) device and the server. In other words, some processing can be performed in the client device and some in the server, without specification of which particular processing is performed in each, or all processing can be performed on one platform or the other, or the platforms can be combined so that there is only one platform. The image processing can be implemented in a parallel computing manner, thus facilitating scaling of the system with respect to database size and input traffic loading.

It is further contemplated that some suitable algorithms will take into account the position and orientation of an object with respect to the user at the time the image was captured, which can be determined based on the appearance of the object in an image. This can be the location and/or identity of people scanned by multiple cameras in a security system, a passive locator system more accurate than UPS or usable in areas where UPS signals cannot be received, the location of specific vehicles without requiring a transmission from the vehicle, and many other uses.

Therefore, it is an object of the present invention to provide a system and process for identifying digitally captured images without requiring modification to the object.

Another object is to use digital capture devices in ways never contemplated by their manufacturer.

Another object is to allow identification of from partial views of the object.

Another object is to provide communication means with operative devices without requiring a public connection therewith.

Various other objects, features, aspects and advantages of the present invention will become more apparent from the following detailed description of preferred embodiments of the invention, along with the accompanying drawings in which like numerals represent like components.

BRIEF DESCRIPTION OF THE DRAWING

FIG. 2 is an idealized view of image capture;

FIG. 4 is a schematic block diagram of a different explanation of invention;

DETAILED DESCRIPTION

Figure 1:
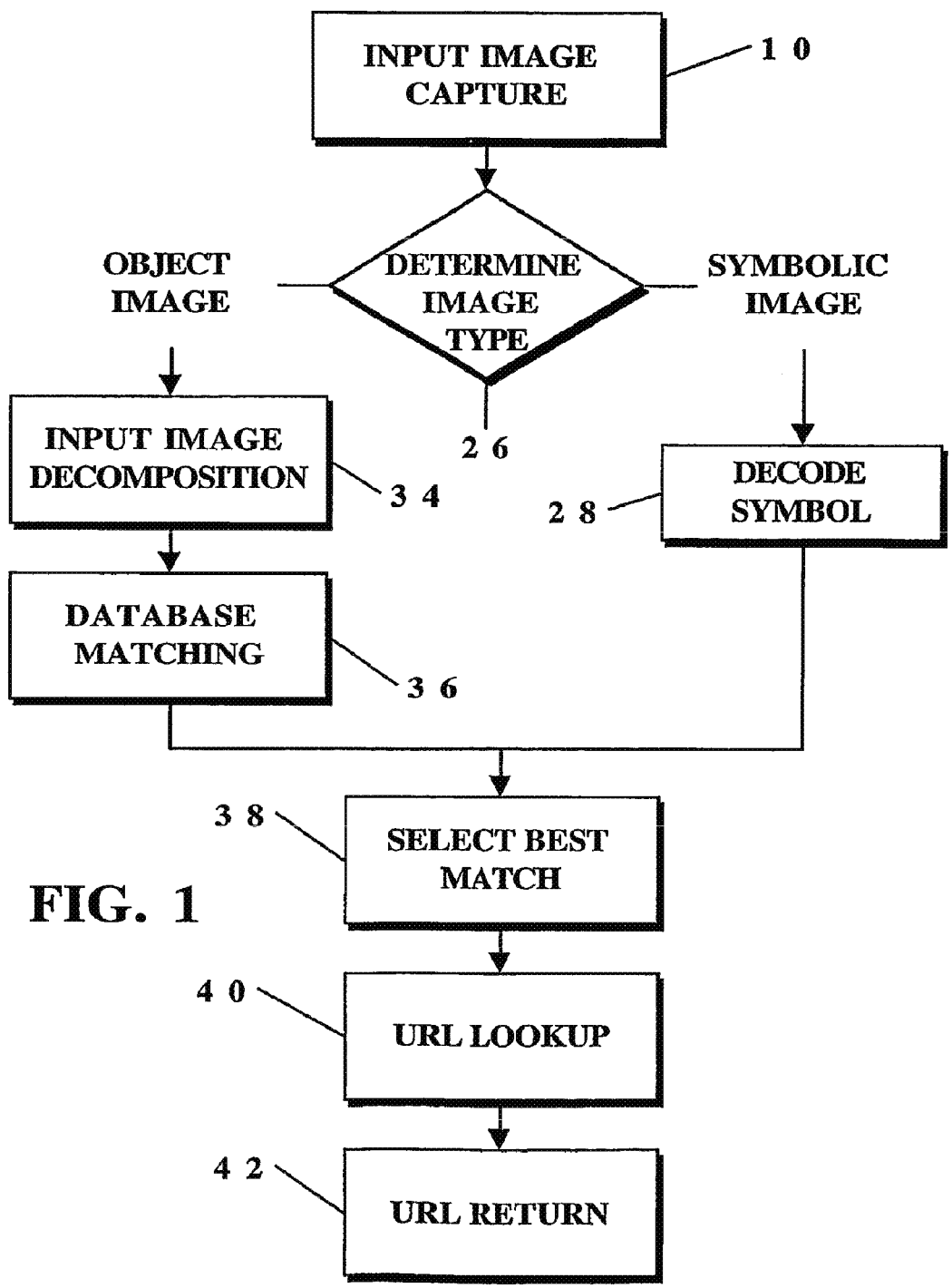
FIG. 1 is a schematic block diagram top-level algorithm flowchart.

FIGS. 1-6 are copied from the priority PCT application, PCT/US02/35407 filed Nov. 5, 2002. Discussion of that those figures is set forth later in the application.
Search Engine-Related Embodiments In FIG. 7 a system 400 generally comprises a portable imaging device 410, a distal server 420, an electronic communications network 425, and a search engine 430.

In general, the portable device 410 captures an image 412 of an object 415; and transmits information 413 regarding the image to the server 420. At least one of the device 410 and the server 420 derives a search term 421A, 421B from at least one of the image 412 and the transmitted information 413, respectively. At least one of the device 410 and the server 420 cause the search term 421A, 421B to be submitted via a network 425 to a search engine 430 that uses an index 432 of web pages or other information. The search engine then uses the search term 421A, 421B to produce a results set 434, and causes at least a portion of the results set 434 to be transmitted back to the portable device 410. In the above discussion it should be appreciated that information regarding the image can include the entire image, one or more subsets of the image, as well as a name or other information derived from the image, but not contained within the image. It should also be appreciated that one could use a proxy server between his/her portable device and the server. I short, the present application contemplates using any complexity of circuitous communication between the mobile client and server—not necessarily a direct connection.

Device 410 can be a cell phone, PDA, laptop computer, or any other portable device that optically captures an image. By "optically captures" is meant some sort of light sensitive array, the output of which can be processed to comprise a visually perceptible image. Viewed from another perspective, device 410 can be any camera having telephony capability, and especially having cell phone capability. With current technology, device 410 would usually have a lens or other light focusing mechanism, although it is contemplated that advances in electronics can eliminate the need for any physical focusing mechanism. The term "optically captures" is not satisfied by a device that has not optical components, and is merely capable of downloading images from the Internet or other sources.

It is certainly contemplated that the cell phone or other device providing the services discussed herein would operate software permitting it to do so. That software could be resident on the device, in external memory (memory card), or paged in as needed.

Object 415 (referred to as a Thing of Interest" in one or more of the priority applications) can be any visually perceptible object, regardless of dimension. Contemplated "two dimensional objects" include objects in which the relevant information is substantially in two dimensional format, which includes advertisements and articles in magazine or other print media, as well as photographs or designs on billboards, street signs, restaurant or other business signs, user manuals, paintings at a museum, and so forth.

Contemplated three dimensional objects include substantially all physical objects in which the relevant information is derived from the shape of the object and/or the appearance of the surface of the object. Thus, an automobile is considered herein to have three dimensions of relevance where the shape or other dimensions convey information about the make and model. Similarly, a window in a building can be considered to have three dimensions of relevance where the identity of the manufacturer or distributor can be gleaned from the overall physical dimensions, detail, and so forth. As another example, a beverage container can be considered to have three dimensions; information can be obtained from the shape of the container but further information can also be obtained from the label, printing, logos, text, or other such visible markings on the container (obtaining information from visible markings on the container enables discrimination between different containers that have identical physical shape). Contemplated three dimensional objects include substantially all physical objects in which the relevant information is derived from changes over time. For example, the speed of a bird or its flight patterns, or a gesture of a person, can be captured in multiple images over a period of time, and can be relevant information, and can be reduced to search terms (referred to as Key Information in one or more of the priority documents) for submission to a search engine. Of course, many objects will be considered to have two, three or four dimensions of relevance herein. Thus, relevant information for an automobile can be provided by each of a two-dimensional logo on the side of the vehicle, the three dimensional shape of the vehicle, and its four dimensional acceleration or handling features.

It is especially contemplated that objects can include animate and inanimate objects. Among animate objects are included faces of people, and biometric information such as the fingerprint pattern on a human finger, an iris of a person, and so forth.

Image 412 is contemplated to be any array of pixels. In most cases the pixels will be regularly arranged, but that is not absolutely necessary. In most cases the pixels also will number greater than 19,200 (160×120), such as 78,800 (320×240) but they can number few than that. More preferred images have greater pixel counts, including for example, 256,000 (640×400), more preferably at least 2 million, and even more preferably at least 4 million. It is not necessary that the image be actually constructed at the portable device. Thus, a statement that "the portable device captures an image of an object" includes situations where the device receives and derives data from light emitted or reflected from the object, even if the data is never presented to a user as a visually perceptible image, and even if the data is sent to a distal server without ever being collected into an image by the device.

The information transmitted to the server can comprise any relevant information regarding the contents of the image.

Thus, information 413 could comprise the entire image, or a portion of the image. For example, where a user takes a picture of a bar code (whether 2D, 3D or any other configuration, the device 410 could process the image 412 to remove color and all background except the bar code itself, and then merely send the portion of the image containing the bar code as the transmitted information 413. In other cases it is contemplated that the device 410 could sufficiently process the image 413 to derive one or more keywords, and then send only the keyword(s) as the transmitted information 413. All possible combinations are also contemplated. Thus, a user might take a photograph of a Gucci™ handbag, the device 412 might derive the word "Gucci" from the image, subtract out background except for the handbag, and then transmit: (a) the word "Gucci"; and (b) the image of the handbag as the transmitted information 413. In such instances the process can be iterative. Thus, the device might initially transmit the word "Gucci" as the first transmitted information, receive a results set from the search engine indicating clothing accessories, and then subtract out background except for the handbag, and transmit the image of the handbag as the second transmitted information. As discussed above, it is specifically contemplated that the device 410 could send the server 420 numerical/digital data that is mathematically derived from the image. Examples include image features and characteristics that the server 420 could use in the server recognition process, without transmitting the original image.

As should be apparent by now, the transmitted information need not be limited to image information. Sights, sounds, text, and all sorts of other information can be included in the transmitted information, some of which can be derived directly from the image, and some of which can be derived indirectly from the image. In addition, the device 410 can also capture non-visual information such as sounds, and that information can also be transmitted. Thus, it is contemplated that the device could capture the sounds of a frog, capture an image of a lake or forest, and send both to be used as (or further analyzed into) search terms.

Distal server 420 is distal in the sense that it has no hard-wired link to device 410. Server 420 can be a single device, as well as any number of devices coupled together, as for example in a server farm. All manner of suitable servers are contemplated. Thus, servers can use any reasonable hardware, operate using any reasonable software, communications protocols, and so forth.

In terms of interaction with the device, the various analytical tasks discussed above can allocated in any suitable manner between server 420 and device 410. For example, in the iterative operation discussed above with respect to the Gucci™ handbag, it is contemplated that the device 410 could analyze the image sufficiently to transmit the term "Gucci" as an initial search term to the search engine 430, and the server 420 could then undertake the tasks of subtracting out background of the image except for the handbag, and transmitting the image of the handbag as a second search term.

In another example, the server 420 could determine that the original image provided insufficient information, and send a message to the user through the device 410, directing the user to take another image (such as from another angle, closer, or with greater detail.). Indeed, the server 420 could direct the user to take an image of another object entirely, in order to help determine identity of the first object. Thus, the user could take a first image of a payment display at a ball game, provide that image to the server for identification, and then instruct the user to take an image of a credit card against which the user wants to be billed for entrance into the ball game. The server could then process the payment against that credit card, and provide an entry code that the user could type to pass through an electronically controlled gate.

In still another example, a user could use his cell phone to capture an image of a screwdriver set at a hardware store, and the cell phone could transmit the information derived from the image to Google™ or some other search engine to find comparison prices. The server 420 could then instruct the user to turn over the packaging and take another image of the set, this time from the back side of the packaging. In this way there is iterative interaction among the user's device, the server, and the search engine.

It should also be appreciated that there are embodiments in which the search engine never communicates with the portable device. For example, the server might do the search query, get results, and provide them to the portable device, or even to a television or other device besides the portable device.

The phase "search engine" is contemplated herein to include any system dedicated to the indexing, searching and retrieval of information. The most familiar search engines such as Google™, Yahoo!™, MSN™, and Alta Vista™ focus mostly or entirely on indexing web pages from the World Wide Web portion of the Internet. Other search engines, such as Lexis/Nexis™ focus on indexing proprietary collections of data, which can include links to Internet Web pages. The phase "search term" is contemplated herein to include any keys or other information used by the search engines to access their indexing system. In the case of most web based search engines, the keys are currently text. In such instances a user typically enters one or more key words, where the term "key word" is used in an extremely broad sense to include: (a) words that would likely be found in a dictionary; (b) proper names, number strings and other terms that are not found in any dictionary; as well as (c) characters that are interpreted as wild cards, truncations and so forth. Such search engines are already starting to experiment with use of non-text keys, including for example images and/or sounds. All such possible keys fall within the scope of contemplated search terms.

Thus, contemplated search terms include key words, a portion of an image, as well as a logo, bar code or other symbol. It is specifically contemplated that in some instances an image will contain a literal of a search terms (e.g. the name of a movie on a movie poster), in some instances an image will not contain such a literal (e.g. a picture of a tree or other plant, where the search term is the name of the plant). In either case the device and/or the server in any combination can perform one or more of the tasks of deriving the search term and submitting it to one or more search engines.

Figure 7:
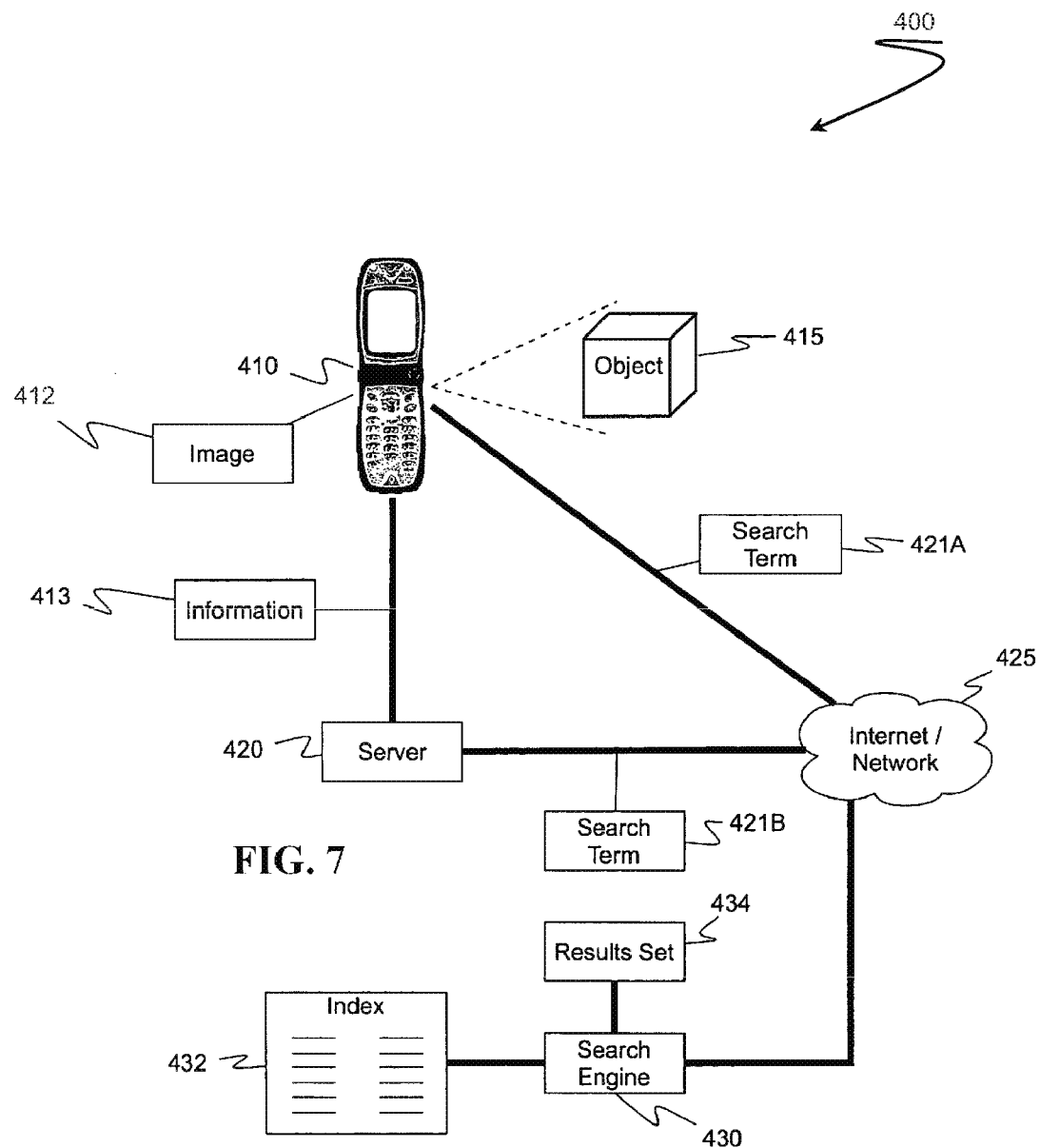
FIG. 7 is a schematic of a system in which a local device captures and image, a search term is automatically derived from an image, is submitted to a search engine to produce a results set, and information from the results set is sent back to the device.

Network 425 can be any workable electronic network, including public and private access networks, and combinations of the two. Preferred networks include the Internet, the upcoming Internet II, cell phone networks, and so forth. Although not expressly shown, the communication lines in FIG. 7 are all contemplated to be one- or two-way communications as appropriate. Moreover, it is contemplated that multiple networks will usually be involved. Thus, for example, communications between device 410 and server 420 will very likely take place over some combination of cell phone (not shown) and Internet networks (e.g. 425), while communications between server and search engine will very likely take place over some combination of Internet and local server farm networks.

The results set 434 can be of any size and composition, but most likely will be tailored to accommodate the device 410. It does very little good, for example, to transmit dozens of web pages to a cell phone, which has insufficient display area to properly view them. Thus, it is contemplated that the results set 434 can be whittled down or otherwise processed by the server which of course is indicated generically by numeral 420 and need not be the very same box as utilized earlier in the transmission of the transmitted information 413) before being sent to the device 410. Thus, the server 420 or some other processor can process results before providing them to the device 410, such as where the search terms are submitted to the search engine by the server 420 rather than by the device 410. But the device 410 can also access the search engine directly using search information provided by the server. Four contemplated search modes include the following:

1. The server 420 composes a search URL (consisting of search engine address and key words) and sends it to the portable device 410. The portable device then executes the search engine query by sending the search URL to the search engine, and the search engine sends one or more web pages back to the portable device.

2. The server 420 sends keywords, and optionally also a search engine address, to portable device 410. The portable device composes a search URL, sends the search query to the search engine, and receives one or more web pages in response.

3. The server 120 sends the search query to the search engine, and receives a response. The server optionally processes the search response (which could be in any form) and provides some result to portable device. The result could, for example, comprise a file sent to the portable device, or a web page on some server, with URL of that web page sent to the portable device.

4. In any of the above modes, or in "direct linking" mode, the result might not be a search results page, but instead some other type of information or action. For example, a server could identify an object, and thereupon send a code to another server, which causes an action to occur. An example of this is clicking on a vending machine with a cell phone to buy something from the machine. Another example is clicking on a TV listing in a newspaper, causing the server to change the channel of the television in front of the user.

Thus, a statement that "the search engine causes at least a portion of the results set 434 to be transmitted back to the portable device 410" should be interpreted herein to mean that at least some information relating to the results set, which information can or can not be included verbatim in the results set, is transmitted back to the device, whether directly or indirectly by the search engine. It is particularly contemplated that a results set could include at least one hyperlinked address.

It is specifically contemplated that results sets can include the following types of information: Uniform Resource Locator (URL); Uniform Resource Identifier (URI); Internet Protocol (IP) address; telephone number; radio frequency or channel; television frequency or channel; and physical location or address. The result(s) displayed to the user can be interactive. In such a case, the user can take further action by interacting directly with the object, by linking to a referenced web page, or some combination of the two. Or, as discussed above, the results could cause another server/computer or machine to perform some action, such as dispensing a product or changing a channel.

From a method perspective, methods of using a search engine to obtain information are contemplated comprising: using a cell phone enabled portable device to take an image of an object; running computer software that automatically derives a first search term from at least a portion the image; submitting the first search term to the search engine; and transmitting the information to the device. Some preferred methods further comprise using the device to take a second image of the object; running the computer software to derive a second search term from at least a portion of the second object; and submitting the second search term along with the first search term to the search engine. Other preferred methods include the step of submitting the first search term can advantageously comprise: sending at least the portion of the image to a distal server; running the software on the server; and the server sending the search term to the search engine. Still other preferred methods include a distal server providing the search term(s) to the device, with the device submitting the search term(s) to the search engine.

Analysis of data (whether visual or otherwise) to produce search terms can be accomplished in any suitable manner. Useful techniques include for example, signal analysis. Fourier analysis, pattern matching, pattern recognition, image recognition, object recognition, wavelet analysis, component analysis, etc.

EXAMPLES

Search terms can be advantageously derived from attribute(s) including name, type, size, color, position, and location, with the derivation performed by algorithm, table/database look-up, hardware device, or other suitable means. For example, consider an example wherein the object being imaged is a poster for the color version of a movie named "Modern Times," starring Charlie Chaplin. The device 410 and/or the server 420 can identify as attributes the text "Modern Times Movie Poster" and "Color Version", and can from that determine search terms such as "Modern Times", "Colorized", "Charlie Chaplin", and "Classic movies". The attributes and search terms in this case could be determined by a human user, a machine algorithm, or some combination of the two.

In another example, a user takes an image of a notebook computer. An algorithm detects the notebook computer in the image and identifies it as being a Model 5, made by ZZZ Corporation. The algorithm then determines the attribute "ZZZ Model 5" and the corresponding search terms, "online shopping", "ZZZ", "notebook", and "5".

An embodiment of particular interest comprises a search using image and/or video input. The device captures one or more of single images, multiple images, motion imagery, and/or video (each and all of these information types are known henceforth as "imagery"). Indeed, the imagery can be captured by more than one electronic imaging device, such as a digital camera, a camera-equipped mobile telephone, or a security camera, or multiple such devices. An object or objects are identified in the imagery via image/object recognition techniques (software and/or hardware). The identity of the object(s) is used to look up, in a table/database, a set of text keywords search terms, which are then provided to a search engine. The search engine returns information addresses (e.g., in the form of a web page with hyperlinks) that are pertinent to the objects identified in the imagery. The user then accesses information and/or computing resources based upon at least one of the information addresses.

Another contemplated embodiment comprises a search using sign language input. Imagery is captured of a person gesturing in sign language. Image/motion recognition techniques are used to translate the sign language into text or other machine-understandable data, such as text. The machine-understandable data is either sent directly to a search engine or is used to determine search terms that in turn are sent to a search engine. The search engine returns information addresses pertinent to the meaning of the sign language or portions thereof.

Still another embodiment comprises search using speech input. There, human speech is captured by a sound capture and/or recording device. Speech recognition processing is then used to recognize the speech and translate it into machine-understandable data (such as text). The machine-understandable data is either sent directly to a search engine or is used to determine search terms that are in turn sent to a search engine. The search engine returns information addresses pertinent to the meaning of the human speech or portions thereof.

An especially preferred embodiment of this invention comprises a search using camera-equipped portable device. There, imagery is captured by a portable device with a network connection (for example, a cellular telephone). Image recognition processing is then used to recognize at least one object in the imagery. The recognition process can be performed in the portable device, in a distant server, or distributed and/or otherwise shared and performed partly in each. Based on the identity of the object(s), text keywords corresponding to the object(s) are retrieved from a database. As with the image recognition, it is preferred that this process occur on a distant server, although it can be performed on the portable device or on a combination of the portable device and the server. The text keywords are then sent to a search engine. This is accomplished by sending the keywords to an Internet search engine web site as an HTTP transaction, with the search keywords embedded in the URL that is sent to the search engine web site. It is preferred that the HTTP transaction be initiated from the portable device, so that the search results are returned directly to the portable device. In this case, the search keywords would generally first be made available on the portable device; if they were determined on the distant server then they are first sent from the server to the portable device. The search engine results are returned to the portable device as a web page which can then be displayed in the web browser of the portable device. If the HTTP transaction was initiated by the server, then the results web page is made available for viewing on the portable device by one or more various means (the address of the results web page can be sent to the portable device, or the entire web page can be sent to the portable device, or the web page can be stored or converted into another form on the server after which the portable device is directed to the address of the stored or converted page, etc.)

Image Analysis

Preferred image analysis techniques are described in the following, in which FIG. 1 shows the overall processing flow and steps. These steps are described in further detail in the following sections.

In FIG. 2, for image capture 10, the user 12 utilizes a computer, mobile telephone, personal digital assistant, or other similar device 14 equipped with an image sensor (such as a CCD or CMOS digital camera). The user 12 aligns the sensor of the image capture device 14 with the object 16 of interest. The linking process is then initiated by suitable means including: the user 12 pressing a button on the device 14 or sensor; by the software in the device 14 automatically recognizing that an image is to be acquired; by user voice command; or by any other appropriate means. The device 14 captures a digital image 18 of the scene at which it is pointed. This image 18 is represented as three separate 2-D matrices of pixels, corresponding to the raw RGB (Red, Green, Blue) representation of the input image. For the purposes of standardizing the analytical processes in this embodiment, if the device 14 supplies an image in other than RGB format, a transformation to RGB is accomplished. These analyses could be carried out in any standard color format, should the need arise.

If the server 20 is physically separate from the device 14, then user acquired images are transmitted from the device 14 to the Image Processor/server 20 using a conventional digital network or wireless network means. If the image 18 has been compressed (e.g. via lossy JPEG DCT) in a manner that introduces compression artifacts into the reconstructed image 18, these artifacts can be partially removed by, for example, applying a conventional despeckle filter to the reconstructed image prior to additional processing.

Image type determination 26 can be accomplished with a discriminator algorithm which operates on the input image 18 and determines whether the input image contains recognizable symbols, such as barcodes, matrix codes, or alphanumeric characters. If such symbols are found, the image 18 is sent to the decode symbol 8 process. Depending on the confidence level with which the discriminator algorithm finds the symbols, the image 18 also can or alternatively contain an object of interest and can therefore also or alternatively be sent to the Object Image branch of the process flow. For example, if an input image 18 contains both a barcode and an object, depending on the clarity with which the barcode is detected, the image can be analyzed by both the Object Image and Symbolic Image branches, and that branch which has the highest success in identification will be used to identify and link from the object.

The image can then be analyzed to determine the location, size, and nature of the symbols in the decode symbol 28. The symbols are preferably analyzed according to their type, and their content information is extracted. For example, barcodes and alphanumeric characters will result in numerical and/or text information.

For object images, one can advantageously perform a "decomposition", in the input image decomposition step 34, of a high-resolution input image into several different types of quantifiable salient parameters. This allows for multiple independent convergent search processes of the database to occur in parallel, which greatly improves image match speed and match robustness in the database matching 36. The best match 38 from either the decode symbol 28, or the image database matching 36, or both, is then determined. If a specific URL (or other online address) is associated with the image, then an URL hookup 40 is performed and the Internet address is returned by the URL Return 42. Code examples are set forth in the priority documents, as well as further detail, including segmentation, segment group generation, bounding box generation, geometric normalization, wavelet decomposition, color cube decomposition, shape decomposition, low-resolution grayscale image generation, grayscale comparison, wavelet comparison, color cube comparison, and calculation of combined match score.

Figure 3A:
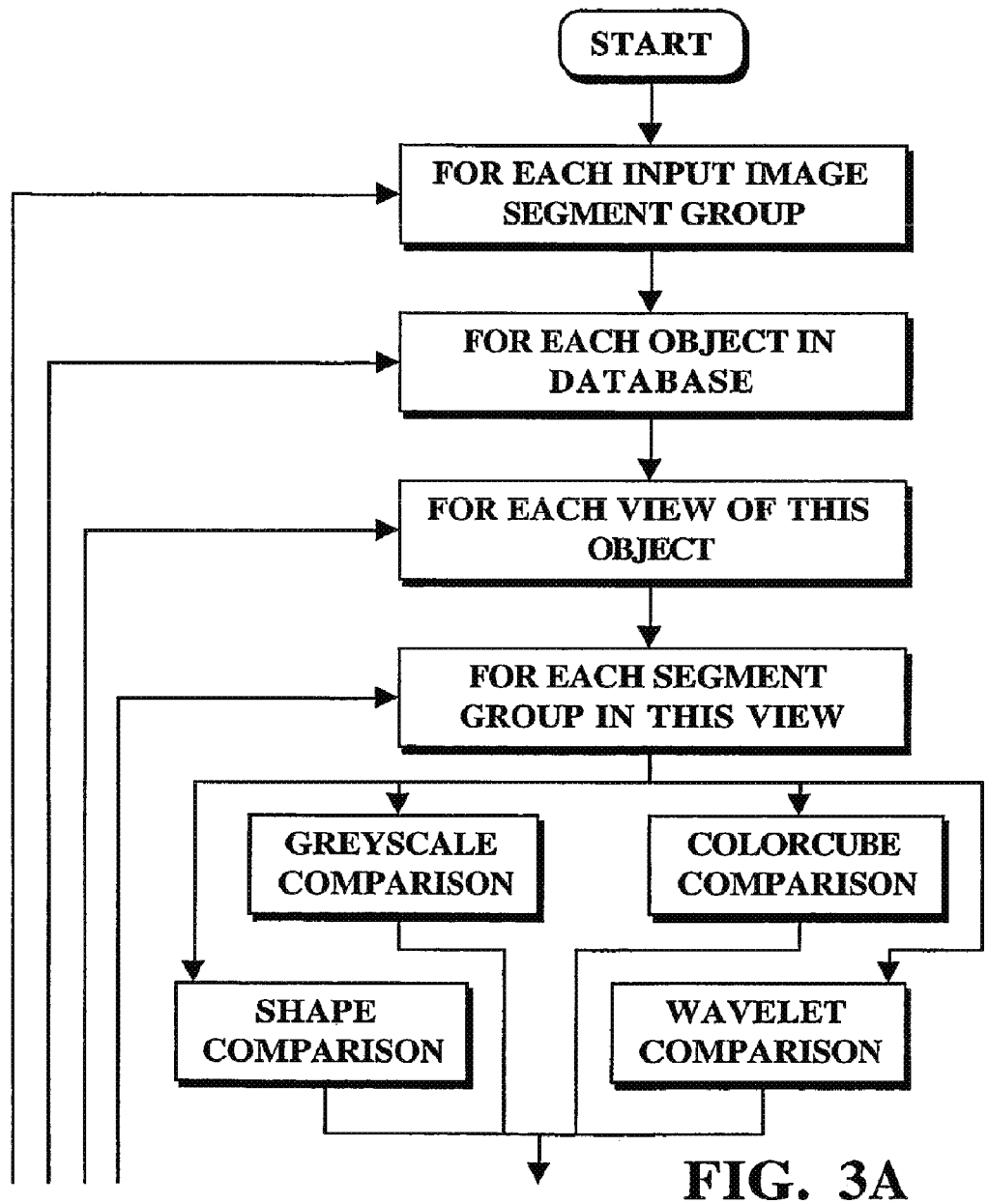
FIGS. 3A and 3B are a schematic block diagram of process details of the present invention.
Figure 3B:
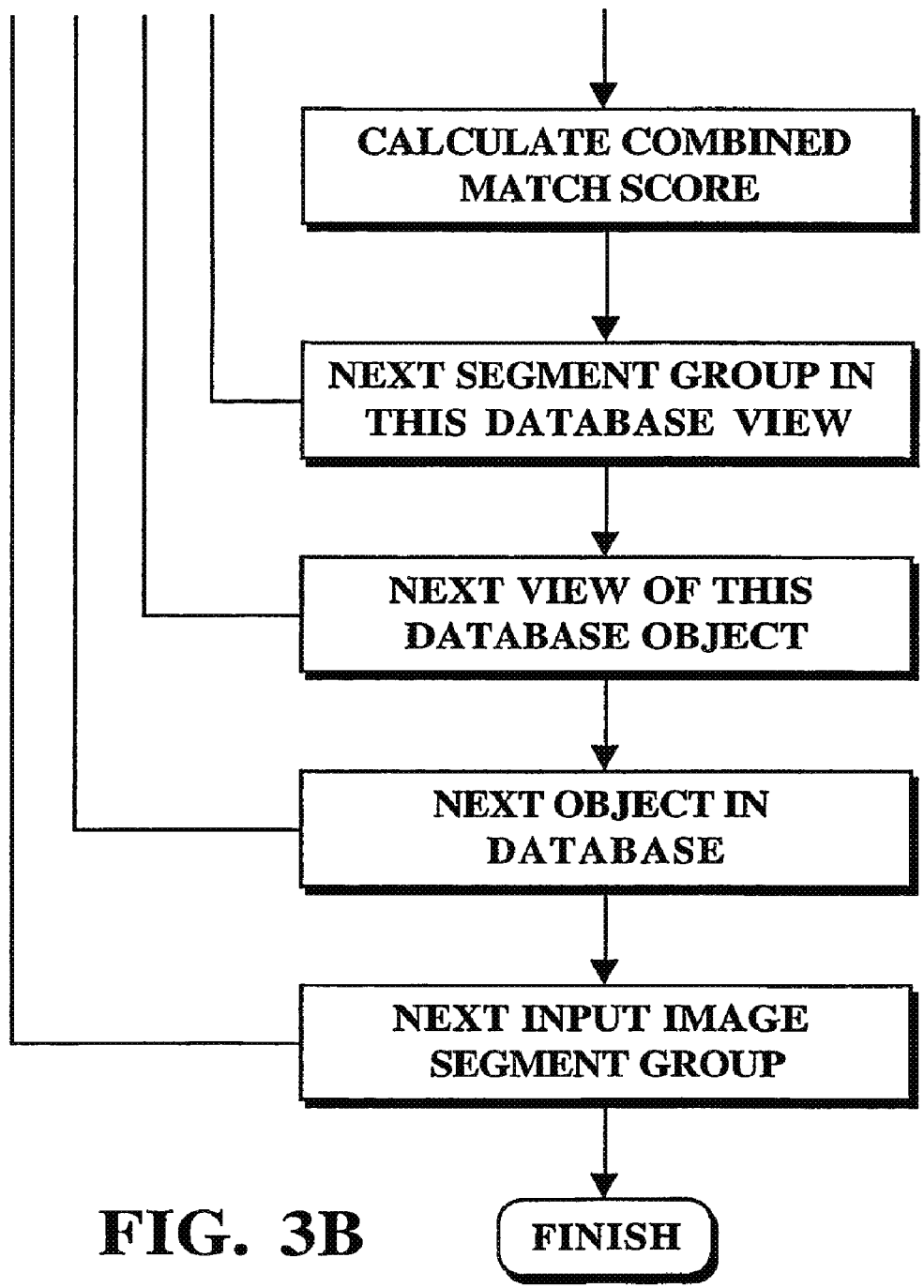

FIGS. 3A and 3B show a preferred process flow that can occur within a database matching operation. The algorithm is presented here as containing four nested loops with four parallel processes inside the innermost loop. This structure is for presentation and explanation only. Any actual implementation, although most likely performing the same operations at the innermost layer, can have a different structure in order to achieve the maximum benefit from processing speed enhancement techniques such as parallel computing and data indexing techniques. It is also important to note that the loop structures can be implemented independently for each inner comparison, rather than the shared approach shown in the FIGS. 1A and 3B.

Preferably, parallel processing is used to divide tasks between multiple CPUs (central processing units) and/or computers. The overall algorithm may be divided in several ways, such as:

| | |
|---|---|
| Sharing the Outer Loop | In this technique, all CPUs run the entire algorithm, including the outer loop, but one CPU runs the loop for the first N cycles, another CPU for the second N cycles, all simultaneously. |
| Sharing the Comparison | In this technique, one CPU performs the loop functions. When the comparisons are performed, they are each passed to a separate CPU to be performed in parallel. |
| Sharing the database | This technique entails splitting database searches between CPUs, so that each CPU is responsible for searching one section of the database, and the sections are searched in parallel by multiple CPUs. This is, in essence, a form of the "Sharing the Outer Loop" technique described above. |

Actual implementations can be some combination of the above techniques that optimizes the process on the available hardware.

Another technique employed to maximize speed is data indexing. This technique involves using a priori knowledge of where data resides to only search in those parts of the database that contain potential matches. Various forms of indexing may be used, such as hash tables, data compartmentalization (i.e., data within certain value ranges are stored in certain locations), data sorting, and database table indexing. An example of such techniques is, in the shape comparison algorithm, if a database is to be searched for an entry with an area with a value of A, the algorithm would know which database entries or data areas have this approximate value and would not need to search the entire database.

FIG. 4 shows a simplified, configuration of an alternative analytical technique. Boxes with solid lines represent processes, software, physical objects, or devices. Boxes with dashed lines represent information. The process begins with an object of interest: the target object 100. In the case of consumer applications, the target object 100 could be, for example, beverage can, a music CD box, a DVD video box, a magazine advertisement, a poster, a theatre, a store, a building, a car, or any other object that user is interested in or wishes to interact with. In security applications the target object 100 could be, for example, a person, passport, or driver's license, etc. In industrial applications the target object 100 could be, for example, a part in a machine, a part on an assembly line, a box in a warehouse, or a spacecraft in orbit, etc.

The terminal 102 is a computing device that has an "image" capture device such as digital camera 103, a video camera, or any other device that an convert a physical object into a digital representation of the object. The imagery can be a single image, a series of images, or a continuous video stream. For simplicity of explanation this document describes the digital imagery generally in terms of a single image, however the invention and this system can use all of the imagery types described above.

After the camera 103 captures the digital imagery of the target object 100, image preprocessing 104 software converts the digital imagery into image data 105 for transmission to and analysis by an identification server 106. Typically a network connection is provided capable of providing communications with the identification server 106. Image data 105 is data extracted or converted from the original imagery of the target object 100 and has information content appropriate for identification of the target object 100 by the object recognition 107, which can be software or hardware. Image data 105 can take many forms, depending on the particular embodiment of the invention. Specific examples are given in the priority documents.

The image data 105 is sent from the terminal 102 to the identification server 106. The identification server 106 receives the image data 105 and passes it to the object recognition 107.

The identification server 106 is a set of functions that usually will exist on computing platform separate from the terminal 102, but could exist on the same computing platform. If the identification server 106 exists on a separate computing device, such as a computer in a data center, then the transmission of the image components 105 to the identification server 106 is accomplished via a network or combination of networks, such a cellular telephone network, wireless Internet, Internet, and wire line network. If the identification server 106 exists on the same computing device as the terminal 102 then the transmission consists simply of a transfer of data from one software component or process to another.

Placing the identification server 106 on a computing platform separate from the terminal 102 enables the use of powerful computing resources for the object recognition 107 and database 108 functions, thus providing the power of these computing resources to the terminal 102 via network connection. For example, an embodiment that identifies objects out of a database of millions of known objects would be facilitated by the large storage, memory capacity, and processing power available in a data center; it is very difficult to have such computing power and storage in a portable device. Whether the terminal 102 and the identification server 106 are on the same computing platform or separate ones is an architectural decision that depends on system response time, number of database records, image recognition algorithm computing power and storage available in terminal 102, etc., and this decision must be made for each embodiment of the invention. Based on current technology, in most embodiments these functions will be on separate computing platforms.

The overall function of the identification server 106 is to determine and provide the target object information 109 corresponding to the target object 100, based on the image data 105.

The object recognition 107 and the database 108 function together to:
1. Detect, recognize, and decode symbols, such as barcodes or text, in the image.
2. Recognize the object (the target object 100) in the image.
3. Provide the target object information 109 that corresponds to the target object 100. The target object information 109 usually (depending on the embodiment) includes an information address corresponding to the target object 100.

The object recognition 107 detects and decodes symbols, such as barcodes or text, in the input image. This is accomplished via algorithms, software, and/or hardware components suited for this task. Such components are commercially available (The HALCON software package from MVTec is an example). The object recognition 107 also detects and recognizes images of the target object 100 or portions thereof. This is accomplished by analyzing the image data 105 and comparing the results to other data, representing images of a plurality of known objects, stored in the database 108, and recognizing the target object 100 if a representation of target object 100 is stored in the database 108.

In some embodiments the terminal 102 includes software, such as a web browser (the browser 110), that receives an information address, connects to that information address via a network or networks, such as the Internet, and exchanges information with another computing device at that information address. In consumer applications the terminal 102 can be a portable cellular telephone or Personal Digital Assistant equipped with a camera 103 and wireless Internet connection. In security and industrial applications the terminal 102 can be a similar portable hand-held device or can be fixed in location and/or orientation, and can have either a wireless or wire line network connection.

Other object recognition techniques also exist and include methods that store 3-dimensional models (rather than 2-dimensional images) of objects in a database and correlate input images with these models of the target object is performed by an object recognition technique of which many are available commercially and in the prior art. Such object recognition techniques usually consist of comparing a new input image to a plurality of known images and detecting correspondences between the new input image and one of more of the known images. The known images are views of known objects from a plurality of viewing angles and thus allow recognition of 2-dimensional and 3-dimensional objects in arbitrary orientations relative to the camera 103.

FIG. 4 shows the object recognition 107 and the database 108 as separate functions for simplicity. However, in many embodiments the object recognition 107 and the database 108 are so closely interdependent that they can be considered a single process.

It is usually desirable that the database 108 be scalable to enable identification of the target object 100 from a very large plurality (for example, millions) of known objects in the database 108. The algorithms, software, and computing hardware must be designed to function together to quickly perform such a search. An example software technique for performing such searching quickly is to use a metric distance comparison technique for comparing the image data 105 to data stored in the database 108, along with database clustering and multi-resolution distance comparisons. This technique is described in "Fast Exhaustive Multi-Resolution Search Algorithm Based on Clustering for Efficient Image Retrieval," by Song, Kim, and Ra, 2000.

In addition to such software techniques, a parallel processing computing architecture can be employed to achieve fast searching of large databases. Parallel processing is particularly important in cases where a non-metric distance is used in object recognition 107, because techniques such database clustering and multi-resolution search can not be possible and thus the complete database must be searched by partitioning the database across multiple CPUs.

As described above, the object recognition 107 can also detect identifying marks on the target object 100. For example, the target object 100 can include an identifying number or a barcode. This information can be decoded and used to identify or help identify the target object 100 in the database 108. This information also can be passed on as part of the target object information 109. If the information is included as part of the target object information 109 then it can be used by the terminal 102 or content server 111 to identify the specific target object 100, out of many such objects that have similar appearance and differ only in the identifying marks. This technique is useful, for example, in cases where the target object 100 is an active device with a network connection (such as a vending machine) and the content server establishes communication with the target object 100. A combination with a Global Positioning System can also be used to identify like objects by their location.

The object recognition 107 can be implemented in hardware, software, or a combination of both. Examples of each category and additional details are set forth in one or more of the priority documents.

In most embodiments the browser 110 will be a web browser, embedded in the terminal 102, capable of accessing and communicating with web sites via a network or networks such as the Internet. In some embodiments, however, such as those that only involve displaying the identity, position, orientation, or status of the target object 100, the browser 110 can be a software component or application that displays or provides the target object information 109 to a human user or to another software component or application.

In embodiments wherein the browser 110 is a web browser, the browser 110 connects to the content server 111 located at the information address (typically an Internet URL) included in the target object information 109. This connection is effected by the terminal 102 and the browser 110 acting in concert. The content server 111 is an information server and computing system. The connection and information exchanged between the terminal 102 and the content server 111 generally is accomplished via standard Internet and wireless network software, protocols (e.g. HTTP, WAP, etc.), and networks, although any information exchange technique can be used. The physical network connection depends on the system architecture of the particular embodiment but in most embodiments will involve a wireless network and the Internet. This physical network will most likely be the same network used to connect the terminal 102 and the identification server 106.

The content server 111 sends content information to the terminal 102 and browser 110. This content information usually is pertinent to the target object 100 and can be text, audio, video, graphics, or information in any form that is usable by the browser 110 and terminal 102. The terminal 102 and browser 110 send, in some embodiments, additional information to the content server 111. This additional information can be information such as the identity of the user of the terminal 102 or the location of the user of the terminal 102 (as determined from a GPS system or a radio-frequency ranging system). In some embodiments such information is provided to the content server by the wireless network carrier.

The user can perform ongoing interactions with the content server 111. For example, depending on the embodiment of the invention and the applications, the user can:

Listen to streaming audio samples if the target object 100 is an audio recording (e.g., compact audio disc).

Purchase the target object 100 via on-line transaction, with the purchase amount billed to an account linked to the terminal 102, to the individual user, to a bank account, or to a credit card.

In some embodiments the content server 111 can reside within the terminal 102. In such embodiments, the communication between the terminal 102 and the content server 111 does not occur via a network but rather occurs within the terminal 102.

In embodiments wherein the target object 100 includes or is a device capable of communicating with other devices or computers via a network or networks such as the Internet, and wherein the target object information 109 includes adequate identification (such as a sign, number, or barcode) of the specific target object 100, the content server 111 connects to and exchanges information with the target object 100 via a network or networks such as the Internet. In this type of embodiment, the terminal 102 is connected to the content server 111 and the content server 111 is connected to the target object 100. Thus, the terminal 102 and target object 100 can communicate via the content server 111. This enables the user to interact with the target object 100 despite the lack of a direct connection between the target object 100 and the terminal 102.

Figure 5:
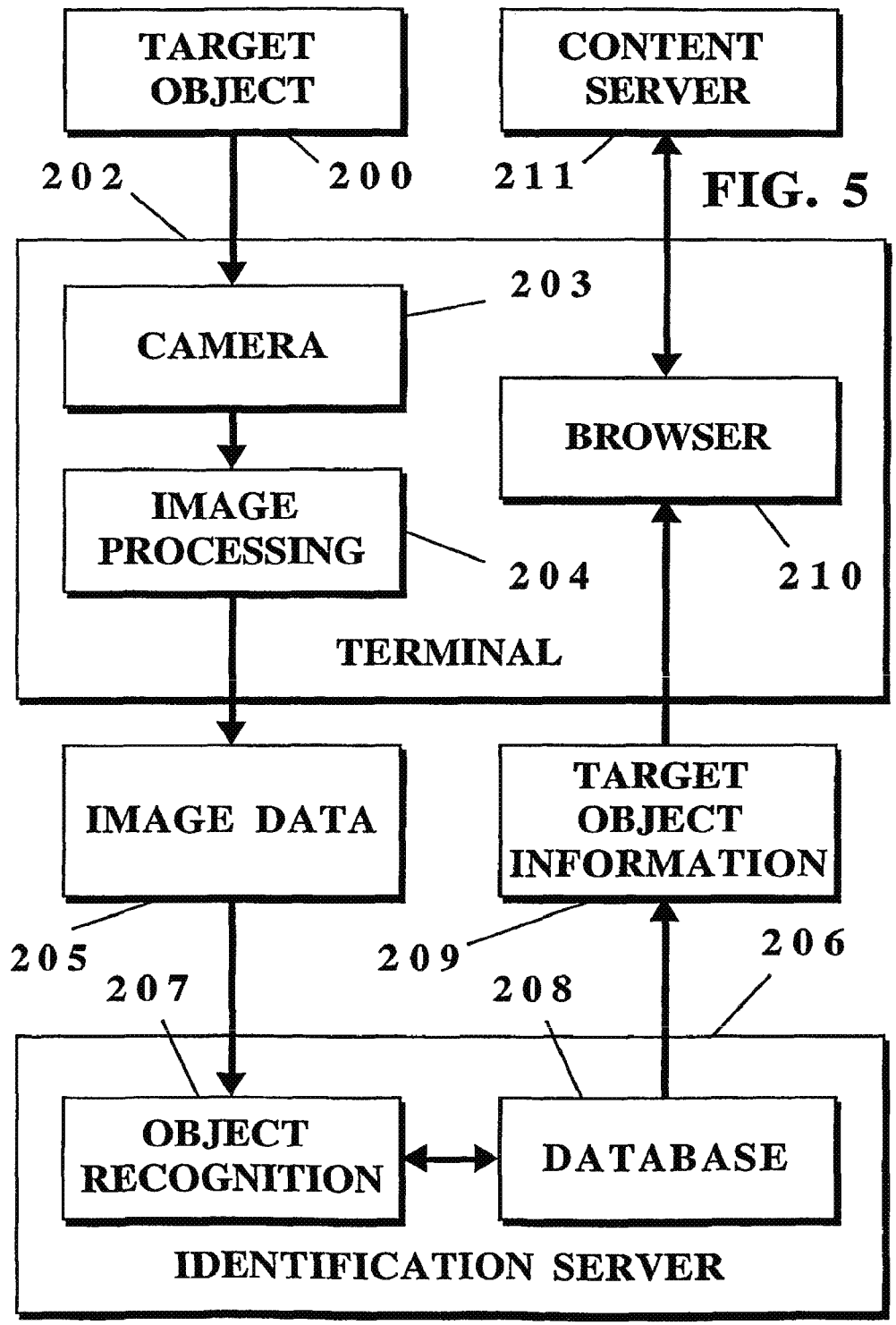
FIG. 5 is a schematic block diagram similar to FIG. 4 for cellular telephone and personal data assistant (PDA) applications.

FIG. 5 shows an embodiment that uses a cellular telephone, PDA, or such portable device equipped with computational capability, a digital camera, and a wireless network connection, as the terminal 202 corresponding to the terminal 102 in FIG. 4. In this embodiment, the terminal 202 communicates with the identification server 206 and the content server 211 via networks such as a cellular telephone network and the Internet.

This embodiment can be used for applications such as the following ("user" refers to the person operating the terminal 202, and the terminal 202 is a cellular telephone, PDA, or similar device, and "point and click" refers to the operation of the user capturing imagery of the target object 200 and initiating the transfer of the image data 205 to the identification server 206).

The user "points and clicks" the terminal 202 at a compact disc (CD) containing recorded music or a digital video disc (DVD) containing recorded video. The terminal 202 browser connects to the URL corresponding to the CD or DVD and displays a menu of options from which the user can select. From this menu, the user can listen to streaming audio samples of the CD or streaming video samples of the DVD, or can purchase the CD or DVD.

The user "points and clicks" the terminal 202 at a print media advertisement, poster, or billboard advertising a movie, music recording, video, or other entertainment. The browser 210 connects to the URL corresponding to the advertised item and the user can listen to streaming audio samples, purchase streaming video samples, obtain show times, or purchase the item or tickets.

The user "points and clicks" the terminal 202 at a television screen to interact with television programming in real-time. For example, the programming could consist of a 1.5 product promotion involving a reduced price during a limited time users that "point and click" on this television programming during the promotion are linked to a web site at which they can purchase the product at the promotional price. Another example is a interactive television programming in which users "point and click" on the television screen at specific times, based on the on-screen content, to register votes, indicate actions, or connect to a web site through which they perform real time interactions with the on-screen program.

The user "points and clicks" on an object such as a consumer product, an advertisement for a product, a poster, etc., the terminal 202 makes a telephone call to the company selling the product, and the consumer has a direct discussion with a company representative regarding the company's product or service. In this case the company telephone number is included in the target object information 209. If the target object information 209 also includes the company URL then the user can interact with the company via both voice and internet (via browser 210) simultaneously.

The user "points and clicks" on a vending machine (target object 200) that is equipped with a connection to a network such as the Internet and that has a unique identifying mark, such as a number. The terminal 202 connects to the content server 211 of the company that operates the vending machine. The identification server identifies the particular vending machine by identifying and decoding the unique identifying mark. The identity of the particular machine is included in the target object information 209 and is sent from the terminal 202 to the content server 211. The content server 211, having the identification of the particular vending machine (target object 200), initiates communication with the vending machine. The user performs a transaction with the vending machine, such as purchasing a product, using his terminal 202 that communicates with the vending machine via the content server 211.

The user "points and clicks" on part of a machine, such as an aircraft part. The terminal 202 then displays information pertinent to the part, such as maintenance instructions or repair history.

The user "points and clicks" on a magazine or newspaper article and link to streaming audio or video content, further information, etc.

The user "points and clicks" on an automobile. The location of the terminal 206 is determined by a Global Position System receiver in the terminal 206, by cellular network radio ranging, or by another technique. The position of the terminal 202 is sent to the content server 211. The content server provides the user with information regarding the automobile, such as price and features, and furthermore, based on the position information, provides the user with the location of a nearby automobile dealer that sells the car. This same technique can be used to direct users to nearby retail stores selling items appearing in magazine advertisements that users "point and click" on.

For visually impaired people:
Click on any item in a store and the device speaks the name of the item and price to you (the items must be in the database).
Click on a newspaper or magazine article and the device reads the article to you.
Click on a sign (building, street sign, etc.) and the device reads the sign to you and provides any addition pertinent information (the signs must be in the database).

Figure 6:
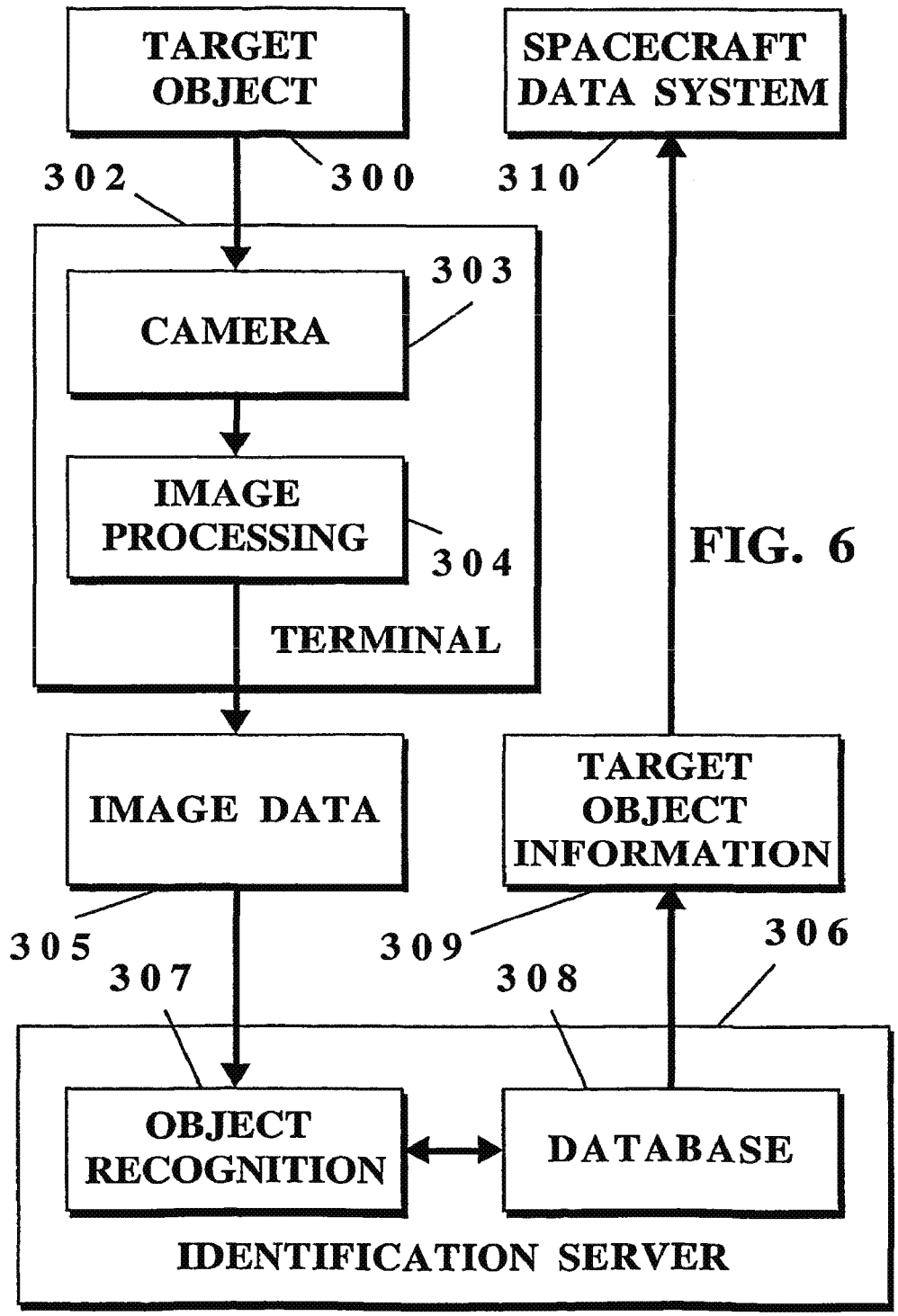
FIG. 6 is a schematic block diagram for spacecraft applications.

FIG. 6 shows an embodiment of the invention for spacecraft applications. In this embodiment, all components of the system (except the target object 300) are onboard a Spacecraft. The target object 300 is another spacecraft or object. This embodiment is used to determine the position and orientation of the target object 300 relative to the Spacecraft so that this information can be used in navigating, guiding, and maneuvering the spacecraft relative to the target object 300. An example use of this embodiment would be in autonomous spacecraft rendezvous and docking.

This embodiment determines the position and orientation of the target object 300, relative to the Spacecraft, as determined by the position, orientation, and size of the target object 300 in the imagery captured by the camera 303, by comparing the imagery with views of the target object 300 from different orientations that are stored in the database 308. The relative position and orientation of the target object 300 are output in the target object information, so that the spacecraft data system 310 can use this information in planning trajectories and maneuvers.

Thus, specific embodiments and applications of using image-derived information as search criteria for Internet and other search engines have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C ... and N, the text should be interpreted as requiring only one element from the group, not A plus N, or B plus N, etc.

What is claimed is:

1. A system comprising:
   a sensor device capable of acquiring a digital representation of a scene, the digital representation comprising non-visual information; and
   a processing platform coupled with the sensor device and that:
      receives transmitted information related to the digital representation, including the non-visual information, from the sensor device;
      derives a search term directly from at least one of the transmitted information and the non-visual information, the search term including a key allowing a search engine to access its indexing system; and
      causes a result set related to search term to be returned to at least one of the sensor device and the processing platform upon submission of the search term to the search engine.

2. The system of claim 1, wherein the non-visual information comprises a sound.

3. The system of claim 2, wherein the sound comprises a natural sound.

4. The system of claim 1, wherein the non-visual information comprises speech.

5. The system of claim 1, wherein the processing platform further discriminates among objects in the scene based on the transmitted information.

6. The system of claim 1, wherein the result set enables a transaction between at least one of the sensor device and the processing platform and an account.

7. The system of claim 6, wherein the account comprises at least one of the following accounts: an account linked to the sensor device, an account linked to user of the sensor device, a bank account, and a credit card account.

8. The system of claim 1, wherein the result set comprises at least one of the following types of data: video data, image data, audio data, streamed data, and text data.

9. The system of claim 1, wherein a sensor device comprises the processing platform.

10. The system of claim 1, wherein a server comprises the processing platform.

11. The system of claim 1, wherein the sensor device comprises one of the following devices: a terminal, a digital camera, a computer, and a mobile phone.

12. The system of claim 1, wherein the result set enables the sensor device to speak a portion of the result set.

13. The system of claim 12, wherein the spoken portion comprises a name of an item in the scene.

14. The system of claim 12, wherein the spoken portion comprises a price of an item in the scene.

15. The system of claim 12, wherein the spoken portion comprises a printed article in the scene.

16. The system of claim 1, wherein the transmitted information comprises image data of the scene.

17. The system of claim 16, wherein the search term is derived based on the image data and the non-visual information.

18. The system of claim 1, wherein the key comprises a non-text key.

19. The system of claim 18, wherein the non-text key comprises an image.

20. The system of claim 18, wherein the non-text key comprises a sound.

* * * * *